(12) United States Patent
Schultz (10) Patent No.: US 11,752,605 B2
(45) Date of Patent: Sep. 12, 2023

(54) CONNECTING TOOL

(71) Applicant: Lear Corporation, Southfield, MI (US)

(72) Inventor: Noah Schultz, English, IN (US)

(73) Assignee: Lear Corporation, Southfield, MI (US)

( * ) Notice: Subject to any disclaimer, the term of this patent is extended or adjusted under 35 U.S.C. 154(b) by 426 days.

(21) Appl. No.: 16/987,996

(22) Filed: Aug. 7, 2020

(65) Prior Publication Data

US 2022/0040832 A1    Feb. 10, 2022

(51) Int. Cl.
*B25B 25/00*    (2006.01)
*B60N 2/58*    (2006.01)
*B60N 2/60*    (2006.01)

(52) U.S. Cl.
CPC ............ *B25B 25/00* (2013.01); *B60N 2/5825* (2013.01); *B60N 2/6027* (2013.01)

(58) Field of Classification Search
CPC ........... B68G 7/00; B68G 7/052; B68G 7/12; B68G 7/08; B68G 7/085; A47C 7/24; A47C 7/26; A47C 7/32; A47C 31/02; A47C 31/023; Y10T 29/48; Y10T 29/481; Y10T 29/487; Y10T 29/488; Y10T 29/489; Y10T 29/486
USPC .............................. 254/120, 131, 131.5, 132
See application file for complete search history.

(56) References Cited

U.S. PATENT DOCUMENTS

| | | | | |
|---|---|---|---|---|
| 100,686 A | * | 3/1870 | Stamp ...................... | B25B 1/24 7/170 |
| 279,652 A | * | 6/1883 | Kilcullen ................ | B66F 15/00 254/131 |
| 357,644 A | * | 2/1887 | Tucker .................... | B25B 13/48 7/165 |
| 606,070 A | * | 6/1898 | Neeb ....................... | F16G 11/12 254/260 |
| 635,936 A | * | 10/1899 | Lee .......................... | B21F 33/02 140/110 |
| 1,317,145 A | * | 9/1919 | Skantz .................... | B66F 15/00 254/120 |
| 1,341,357 A | * | 5/1920 | Careaga ........................ | 223/102 |
| 1,510,035 A | * | 9/1924 | Bradley ................... | B66D 3/02 5/214 |
| 1,606,221 A | * | 11/1926 | Hergesheimer ......... | F16G 11/12 242/388.2 |
| 1,731,556 A | * | 10/1929 | Wren ..................... | B68G 7/085 223/102 |
| 1,843,866 A | * | 2/1932 | Chapman .............. | B25B 27/306 29/227 |
| 1,862,172 A | * | 6/1932 | Raisley ................. | B25B 27/308 29/256 |

(Continued)

FOREIGN PATENT DOCUMENTS

| | | |
|---|---|---|
| JP | 2013162806 A | 8/2013 |
| JP | 2014000323 A | 1/2014 |
| WO | 2004016462 A1 | 2/2004 |

*Primary Examiner* — Jason L Vaughan
(74) *Attorney, Agent, or Firm* — Fishman Stewart PLLC (57) ABSTRACT

A connecting tool for connecting a first connecting portion and a second connecting portion of at least one connecting member. The connecting tool may include a shaft. The shaft may include a shaft axis, an operational end, and a body. The shaft may include a recess configured to engage said first connecting portion of said at least one connecting member. The operational end may include an aperture configured to engage said second connecting portion of said at least one connecting member.

20 Claims, 10 Drawing Sheets

(56) References Cited

U.S. PATENT DOCUMENTS

| | | | | |
|---|---|---|---|---|
| 1,889,167 A * | 11/1932 | Anderson | ............. | B25B 27/306 29/227 |
| 1,932,139 A * | 10/1933 | Lofman | ............... | A47C 31/026 5/696 |
| 1,943,174 A * | 1/1934 | Gagnon | ................. | B68G 7/085 223/102 |
| 2,042,287 A * | 5/1936 | Allievi | ................. | B60T 17/221 29/227 |
| 2,673,392 A * | 3/1954 | McFadden | ............. | A47C 23/00 29/227 |
| 2,685,731 A * | 8/1954 | Vertin | ................... | B25B 27/306 29/227 |
| 2,811,772 A * | 11/1957 | Johnson | ............... | B25B 27/306 29/227 |
| 3,003,816 A | 10/1961 | Wilson | | |
| 3,154,229 A * | 10/1964 | Mount | .................. | D05C 15/06 223/102 |
| 4,063,342 A * | 12/1977 | Mitchell | .............. | B60T 17/221 29/227 |
| 5,165,154 A * | 11/1992 | Miller | ................... | B25B 27/306 29/227 |
| 5,237,729 A * | 8/1993 | Martin | ................... | B25B 27/306 29/227 |
| 5,371,936 A * | 12/1994 | Blanchard | ............ | B25B 27/306 29/436 |
| 5,455,996 A * | 10/1995 | Ploeger | ................. | B60T 17/221 29/426.6 |
| 5,477,599 A * | 12/1995 | Blanchard | ............ | B25B 27/306 29/244 |
| 5,528,808 A * | 6/1996 | Holubek | ................ | B25B 27/20 29/241 |
| 5,875,695 A * | 3/1999 | Zavilla | ................ | B25B 27/0035 81/484 |
| 6,161,817 A * | 12/2000 | Lee | ....................... | F16H 7/1281 254/131 |
| 7,062,826 B2 * | 6/2006 | Ho | ...................... | B25B 27/0064 29/240.5 |
| 8,128,166 B2 | 3/2012 | Hoshina et al. | | |
| 2005/0081353 A1 | 4/2005 | Law | | |
| 2011/0240690 A1 | 10/2011 | Newsom et al. | | |

\* cited by examiner

CONNECTING TOOL

TECHNICAL FIELD

The present disclosure generally relates to a connecting tool configured to facilitate engaging connecting structures of a connecting member, such as connecting structures disposed at opposing ends of a drawstring of a trim assembly of a vehicle seat assembly.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some connecting members may be actuated by hands of a user, such as via pulling one or more portions. Some connecting members may have portions that are challenging to pull, involve large forces to actuate, are difficult to engage, and/or need to be actuated in tight spaces or spaces that are difficult to access. Actuation of some connecting members may be labor intensive, involve extensive physical exertion by the user, and/or may not be sufficiently efficient or effective.

There is a desire for solutions/options that minimize or eliminate one or more challenges or shortcomings of connecting members and/or actuating connecting members. The foregoing discussion is intended only to illustrate examples of the present field and is not a disavowal of scope.

SUMMARY

In embodiments, a connecting tool for connecting a first connecting portion and a second connecting portion of at least one connecting member may include a shaft. The shaft may include a shaft axis, an operational end, and a body. The shaft may include a recess configured to engage said first connecting portion. The operational end may include an aperture configured to engage said second connecting portion.

In embodiments, a method of operating a connecting tool to connect a first connecting portion and a second connecting portion of at least one connecting member may include slidably connecting the first connecting portion to a shaft of the connecting tool. The method may include engaging the second connecting portion with an aperture of an operational end of the connecting tool, rotating the connecting tool relative to the first connecting portion, sliding the first connecting portion along the shaft, and moving the first connecting portion off the operational end of the connecting tool and into engagement with the second connecting portion.

The foregoing and other potential aspects, features, details, utilities, and/or advantages of examples/embodiments of the present disclosure will be apparent from reading the following description, and from reviewing the accompanying drawings.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they do not limit the present disclosure to these embodiments and/or examples. On the contrary, the present disclosure covers alternatives, modifications, and equivalents.

Figure 1A:
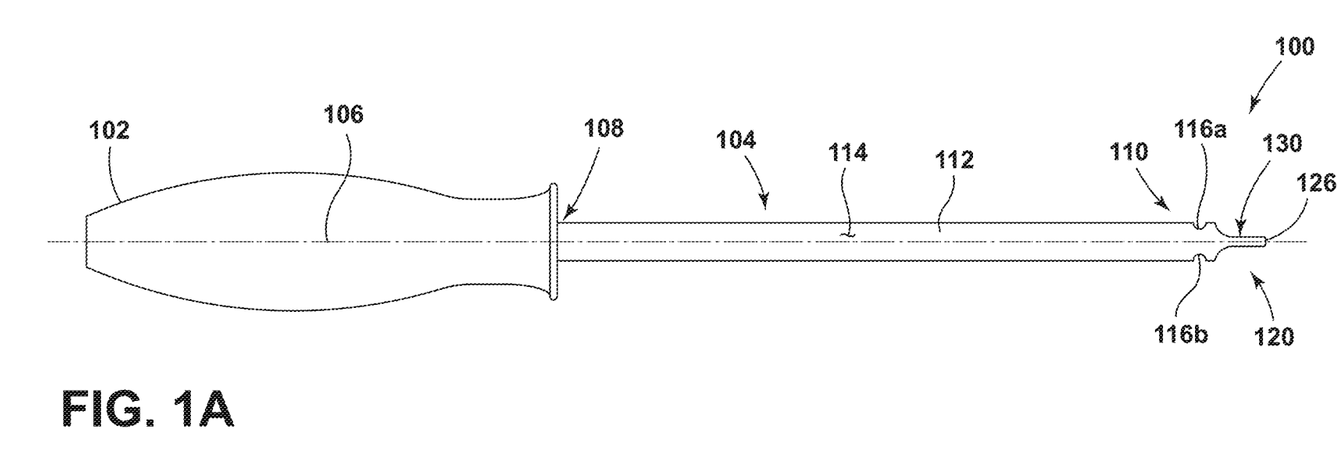
FIG. 1A is a side view of a connecting tool according to an embodiment of the present disclosure.
Figure 1B:
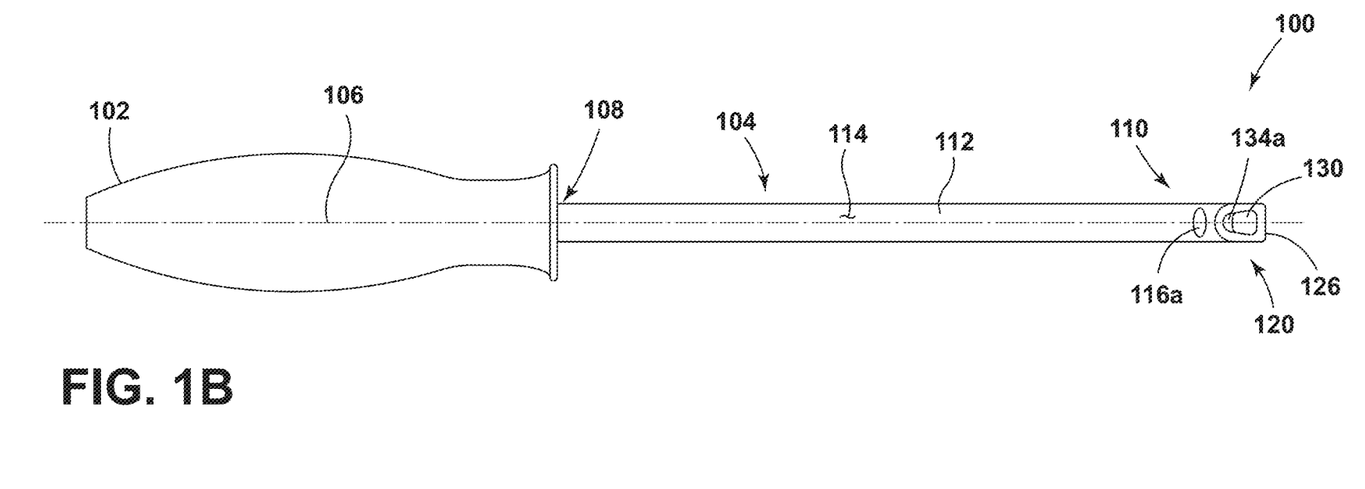
FIG. 1B is a top view of a connecting tool according to an embodiment of the present disclosure.
Figure 1C:
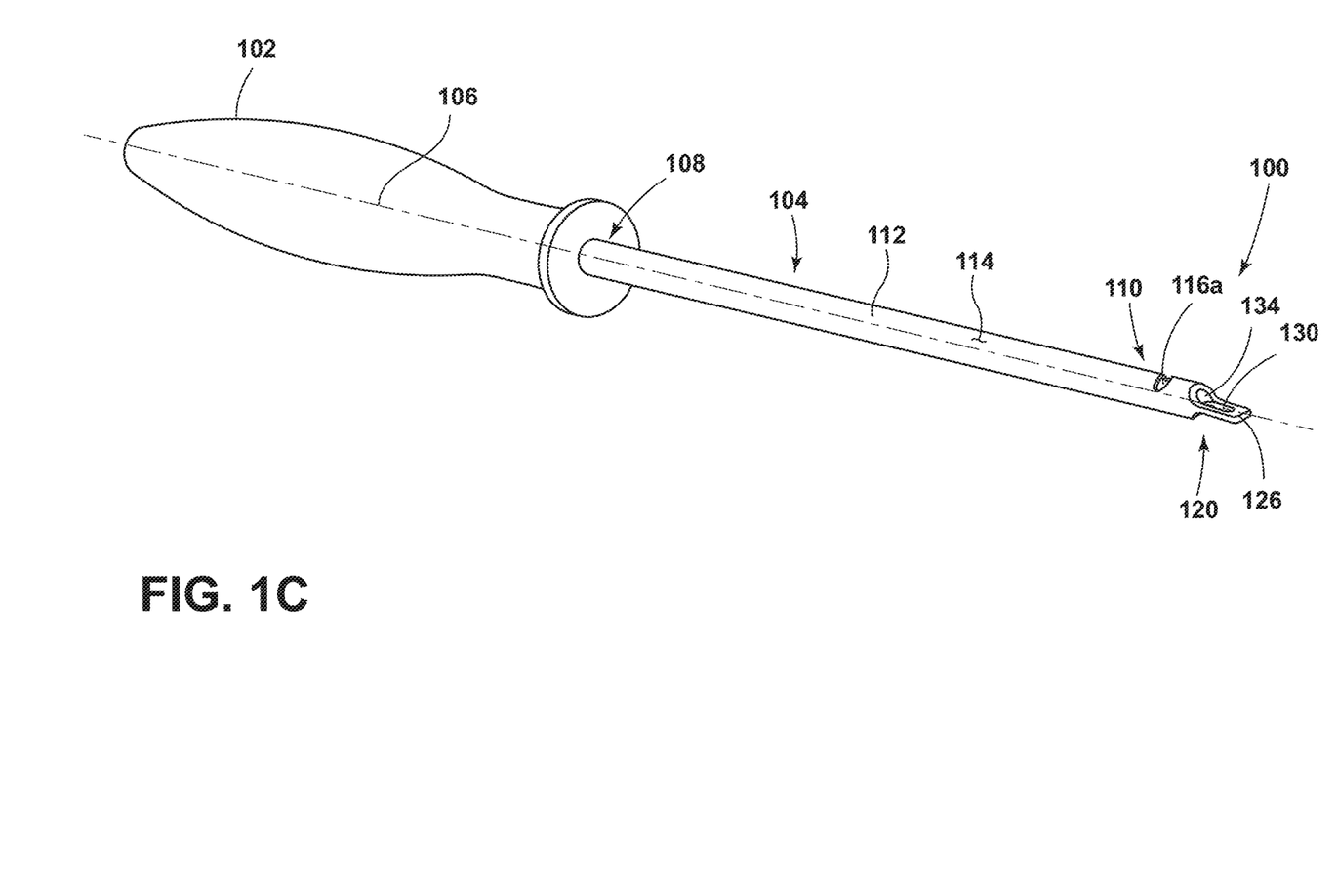
FIG. 1C is a perspective view of a connecting tool according to an embodiment of the present disclosure.

In embodiments, such as generally illustrated in FIGS. 1A, 1B, and 1C, a connecting tool 100 may include a handle 102. The handle 102 may include any suitable shape or size, and/or may be composed of any suitable material (e.g., metal, plastic, wood, a composite material, etc.). In some examples, the handle 102 may be configured and/or shaped ergonomically, such as to facilitate holding by a user. Additionally and/or alternatively, the handle 102 may include one or more structures (e.g., curves, bumps, ribs, protrusions, grips, etc.) to facilitate gripping of the connecting tool 100 by the user.

With embodiments, such as generally illustrated in FIGS. 1A, 1B, and 1C, a connecting tool 100 may include a shaft 104. The shaft 104 may be of any desired size and shape, and may be composed of any desired material (e.g., metal, plastic, wood, a composite material, etc.). The shaft 104 may have a shaft axis 106, a first end 108 (e.g., a base end), a second end 110 (e.g., an operational end), and/or a body 112 (e.g., a shank). In some embodiments, the shaft 104 may extend longitudinally along the shaft axis 106 and may have an external surface 114. The shaft axis 106 may be a central longitudinal axis of the shaft 104. In embodiments, the shaft 104 may include an elongated body or rod having a substantially circular cross-sectional shape and/or the external surface 114 may be an outer circumferential surface. The base end 108 and the operational end 110 may be opposite axial ends of the shaft 104. The body 112 may be disposed between and connect the base end 108 and the operational end 110.

In embodiments, the handle 102 and the shaft 104 may be connected to one another. With examples, the handle 102 may be connected to the base end 108 of the shaft 104. The shaft 104 may be disposed coaxial with handle 102. The handle 102 and the shaft 104 may be connected to one another via one or more connections, such as a pin, a fastener, a clip, a screw, adhesive, material bonding, welding, and/or complimentary mechanical structures, among others. Additionally and/or alternatively, the handle 102 may be formed and/or molded onto the shaft 104. The shaft 104 may be inserted at least partially into and/or secured at least partially within a recess of the handle 102. The shaft 104 and handle 102 may be integrally connected to one other such that the connecting tool is structured as a single, monolithic component (e.g., without separately attached elements, elements that move/rotate relative to the shaft, etc.). In examples, the connecting tool 100 may not include a handle 102 and the user may directly hold the shaft 104, such as at or near the base end 108 and/or the body 112.

Figure 2A:
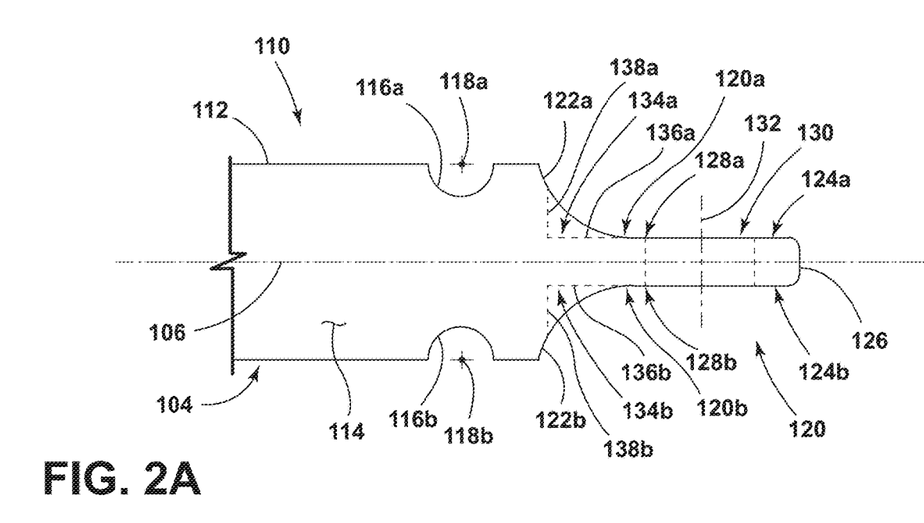
FIG. 2A is an enlarged side view of an operational end of a connecting tool according to an embodiment of the present disclosure.
Figure 2B:
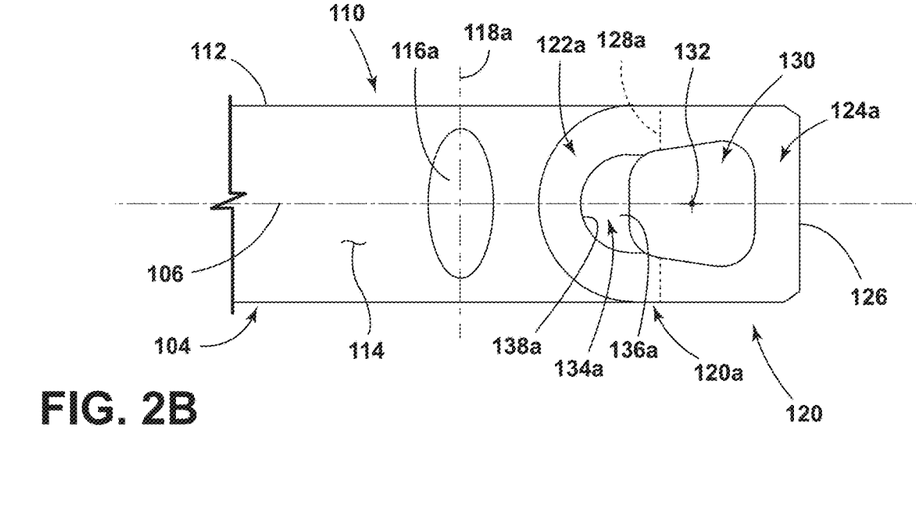
FIG. 2B is an enlarged top view of an operational end of a connecting tool according to an embodiment of the present disclosure.

In embodiments, such as generally illustrated in FIGS. 2A and 2B, a shaft 104 may include one or more recesses 116a, 116b. The one or more recesses 116a, 116b may be configured to engage and/or at least partially receive a first connecting portion 142 of a connecting member 140 (see, e.g., FIG. 3D). A recess 116a, 116b may be disposed in the external surface 114 of the shaft 104 and/or may be configured as a depression or groove that protrudes into the shaft 104 toward the shaft axis 106. A recess 116a, 116b may have a recess axis 118a, 118b, which may extend obliquely or perpendicularly to the shaft axis 106. A recess 116a, 116b may include one or more of a variety of shapes and/or configurations. For example and without limitation, a recess 116a, 116b may be rounded/curved (e.g., generally cylindrical/semicylindrical) and/or may include a cross-section of a portion (e.g., half) of a circle. A recess 116a, 116b may be disposed in the body 112 of the shaft 104 and may be in, adjacent to, and/or proximate the operational end 110.

In embodiments, a connecting tool 100 may have multiple recesses 116a, 116b, such as a first recess 116a and a second recess 116b. The first and second recesses 116a, 116b may be configured the same as one another or differently from one another. The first and second recesses 116a, 116b may be disposed on opposite sides of the shaft 104 such that the first and second recesses 116a, 116b are disposed diametrically opposite one another relative to the shaft 104 and/or the body 112. Additionally or alternatively, the first and second recesses 116a, 116b may be disposed such that the recess axis 118a of the first recess 116a and the recess axis 118b of the second recess 116b are substantially parallel. The recesses 116a, 116b may, for example, be substantially aligned in an axial direction of the shaft 104.

With examples, the operational end 110 of the shaft 104 may include a tip portion 120. The tip portion 120 may include one or more curved surfaces 122a, 122b and/or one or more planar surfaces 124a, 124b. The planar surfaces 124a, 124b may be configured the same as one another or differently from one another. The curved surfaces 122a, 122b may be configured the same as one another or differently from one another.

In embodiments, a planar surface 124a, 124b may extend parallel to the shaft axis 106 between a curved surface 122a, 122b and an axially facing surface 126 of the shaft 104. In examples, a planar surface 124a, 124b may extend from and connect a curved surface 122a, 122b to the axial surface 126 of the shaft 104.

In examples, a curved surface 122a, 122b may extend (e.g., axially and/or radially) between a planar surface 124a, 124b and the external surface 114 of the shaft 104. A curved surface 122a, 122b may extend from and connect an inner axial end 128a, 128b of a planar surface 124a, 124b to the external surface 114 of the shaft 104 (e.g., an outer circumferential surface). A curved surface 122a, 122b may include a concave configuration (e.g., relative to the shaft axis 106).

With embodiments, a tip portion 120 may include an aperture 130 that may be configured to engage (e.g., connect with, receive, etc.) a second connecting portion 144 of the connecting member 140. The aperture 130 may be disposed in one or both planar surfaces 124a, 124b. An axial end of the aperture 130, relative to the shaft axis 106, may be disposed along, at, and/or adjacent to a junction 120a, 120b of the curved surface 122a, 122b and the planar surface 124a, 124b, which may also correspond to the inner axial end 128a, 128b of the planar surface 124a, 124b. The aperture 130 may be configured as a through-hole, depression, recess, or similar structure. The aperture 130 may have a cross-sectional profile with one or more of a variety of shapes, such as a trapezoid, a square, a rectangle, a circle, and/or an oval, among others. The aperture 130 may extend completely through the tip portion 120 such that an aperture axis 132 of the aperture 130 extends obliquely or perpendicular to the shaft axis 106 and/or the recess axis 118a, 118b. In at least some examples, the aperture axis 132 may be a central longitudinal axis of the aperture 130.

In embodiments, the tip portion 120 may include one or more notches 134a, 134b that may be configured to facilitate engagement of the second connecting portion 144 with the aperture 130. The notches 134a, 134b may be configured the same as one another or differently from one another. The notch 134a, 134b may be disposed in the curved surface 122a, 122b. In some examples, a notch 134a, 134b may include and/or be at least partially defined by a first surface 136a, 136b and a second surface 138a, 138b.

With embodiments, the first surface 136a, 136b of a notch 134a, 134b may be substantially parallel and/or coplanar with the planar surface 124a, 124b. The first surface 136a, 136b may extend from the second surface 138a, 138b to a junction 120a, 120b of the curved surface 122a, 122b and the planar surface 124a, 124b, the axial end 128a, 128b of the planar surface 124a, 124b, and/or the aperture 130.

In embodiments, the second surface 138a, 138b may be disposed obliquely, parallel, and/or perpendicular to the first surface 136a, 136b and/or the shaft axis 106. For example and without limitation, a second surface 138a, 138b may include portions that are disposed perpendicular relative to the shaft axis 106, portions (e.g., rounded/arced portions) that are disposed obliquely relative to the shaft axis 106, and portions that are disposed parallel with the shaft axis 106 (e.g., a cross-section of a second surface 138a, 138b may generally resemble a horseshoe). The second surface 138a, 138b may extend from the planar surface 124a, 124b to the curved surface 122a, 122b. Opposite ends of the second surface 138a, 138b may be disposed at or about a junction 120a, 120b of the curved surface 122a, 122b and the planar surface 124a, 124b, the inner axial end 128a, 128b of the planar surface 124a, 124b, and/or the aperture 130 such that the second surface 138a, 138b extends toward the handle 102 and/or the base end 108.

In embodiments, the tip portion 120 may have multiple curved surfaces 122a, 122b, multiple planar surfaces 124a, 124b, and/or multiple notches 134a, 134b, which may be configured and disposed as described above. In some examples, the multiple curved surfaces 122a, 122b may include a first curved surface 122a and a second curved surface 122b, the multiple planar surfaces 124a, 124b may include a first planar surface 124a and a second planar surface 124b, and/or the multiple notches 134a, 134b may include a first notch 134a and a second notch 134. The first and second curved surfaces 122a, 122b, the first and second planar surfaces 124a, 124b, and/or the first and second notches 134a, 134b, respectively, may be disposed on different sides of the shaft 104 (e.g., may be diametrically opposite each other).

In embodiments, the first planar surface 124a and the second planar surface 124b may extend substantially parallel to one another and/or the shaft axis 106. The aperture 130 may extend through the tip portion 120 from the first planar surface 124a to the second planar surface 124b.

With embodiments, such as generally illustrated in FIGS. 3A-3F, a connecting tool 100 may be configured to facilitate connecting and/or engaging connecting portions 142, 144 of one or more connecting members 140 that may be utilized to secure one or more components 146 together. The connecting portions 142, 144 may include one or more structures that may be configured to engage and/or connect to one another, such as complimentary latches, buckles, male-female connectors, hooks, loops, buttons, and/or elongated bodies that may be connected together, among others. The connecting portions 142, 144 may be connected to and/or form part of the same connecting member 140 or different connecting members 140. For example and without limitation, the connecting portions 142, 144 may be disposed at opposite ends of the same connecting member 140. In configurations including multiple connecting members, a connecting portion 142 of a first connecting member 140 may be connectable to a connecting portion 144 of a second connecting member 140.

In embodiments, a connecting member 140 may include one or more of a variety of shapes, sizes, configurations, and/or materials. For example and without limitation, a connecting member may be flexible, elastic, and/or deformable (e.g., may include a drawstring, a rope, a cable, a bungee cord, a tie down strap, etc.). In some embodiments, the connecting member 140 may be configured to facilitate a connection between a first component 146a and a second component 146b. A first component 146a may, for example and without limitation, include a vehicle seat (e.g., padding, seat frame, foam, etc.), and/or a second component 146b may, for example and without limitation, include a trim piece (e.g., an outer seat surface or material, such as leather or vinyl). The connecting member 140 may be configured to connect and/or facilitate a connection between the trim piece and the vehicle seat.

Figure 4:
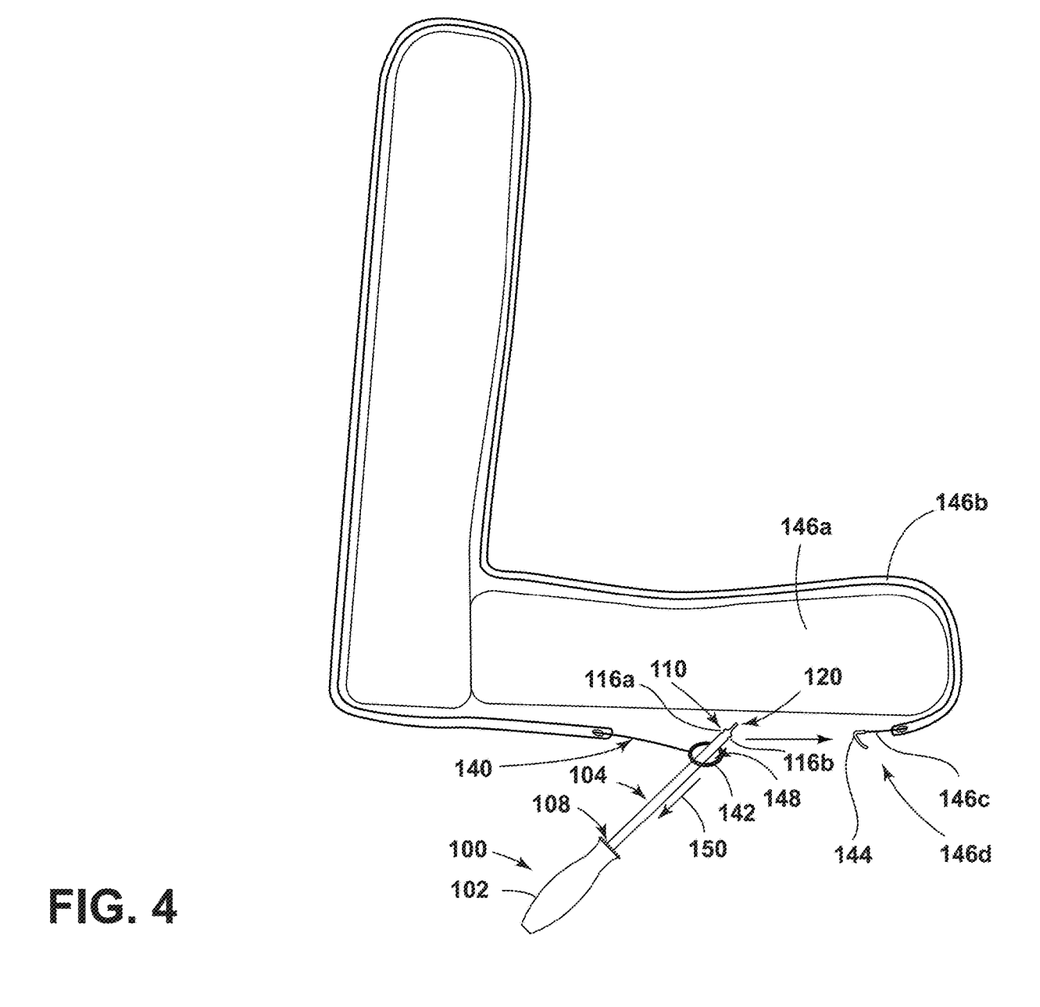
FIG. 4 is a side view of a connecting tool, a connecting member, a first component, and a second component according to an embodiment of the present disclosure.

With embodiments, the connecting member 140 may be disposed and/or wrapped around components 146a, 146b and the connecting portions 142, 144 disposed at opposite ends of the connecting member 140 may be engaged with one another to connect the components 146a, 146b together. Additionally and/or alternatively, the connecting member 140 may be a member connected to and/or inserted within a portion 146c (e.g., a channel) of a component 146a, 146b and may be used to reduce the size of and/or close an opening 146d of the component 146a, 146b (see, e.g., FIG. 4). In such examples, the connecting member 140 may at least partially surround the opening 146d of the component 146 and the connecting portions 142, 144 disposed at opposite ends of the connecting member 140 may be drawn together and connected (e.g., a drawstring for a trim portion of a seat). For example and without limitation, with a seat application, the second component 146b (e.g., a trim piece) may include a channel 146c in which the connecting member 140 may be substantially disposed. The channel 146c may extend around an opening 146d of the second component 146b that may be configured to receive at least some of the first component 146a. Once the first component 146a has been inserted at least partially into the opening 146d, the connecting portions 142, 144 may be connected together, which may reduce the size of the opening 146d (e.g., to a size smaller than the outer dimensions of the first component 146a) and/or connect the components 146a, 146b. Reducing the size of the opening 146d via the connecting member 140 may restrict relative movement of the first component 146a and the second component 146b.

In examples, at least one connecting portion 142, 144 of the connecting member 140 may be connected to a connecting portion of another structure, such as a component or another connecting member 140 (e.g., a series of bungie cords connected to one another in series). In examples with multiple connecting members 140, a first connecting member 140 and a second connecting member 140 may be connected to different components 146a, 146b or to the same component 146a, 146b. In some embodiments, the first and second connecting members 140 may be connected to opposite ends of a component 146a, 146b and/or on opposite sides of an opening 146d of the component 146a, 146b.

With embodiments, the connecting member 140 may need to be actuated by a user, operator, and/or assembler to engage the connecting portions 142, 144 with one another. To actuate the connecting member 140, the user may move (e.g., push/pull) the connecting portions 142, 144 of the connecting member 140 closer together such that the connecting portions 142, 144 may be engaged with one another. Actuation of the connecting member 140, thus, may involve applying sufficient force to the connecting member 140 to overcome one or more resistance forces. In examples, this may include applying enough force to overcome a resistance force of an elastic connecting member 140 and, thereby, deform/stretch the elastic connecting member 140. Additionally and/or alternatively, this may include the user applying enough force to move, adjust, deform, stretch, and/or compress one or more of the components 146a, 146b that are being connected via the connecting member 140 (e.g., applying enough force to deform at least portions of the component 146a, 146b and/or to reduce the size of and close an opening 146d of the component 146a, 146b). Once the user has applied sufficient force and actuated the connecting member 140, the user may engage the connecting portions 142, 144 with one another while maintaining the applied force (e.g., while maintaining the deformed and/or stretched position of the connecting member 140). The difficulty and/or complexity of the actuating and/or connecting process may be reduced by utilizing the connecting tool 100 to actuate the connecting member 140 and/or engage the connecting portions 142, 144.

Figure 3A:
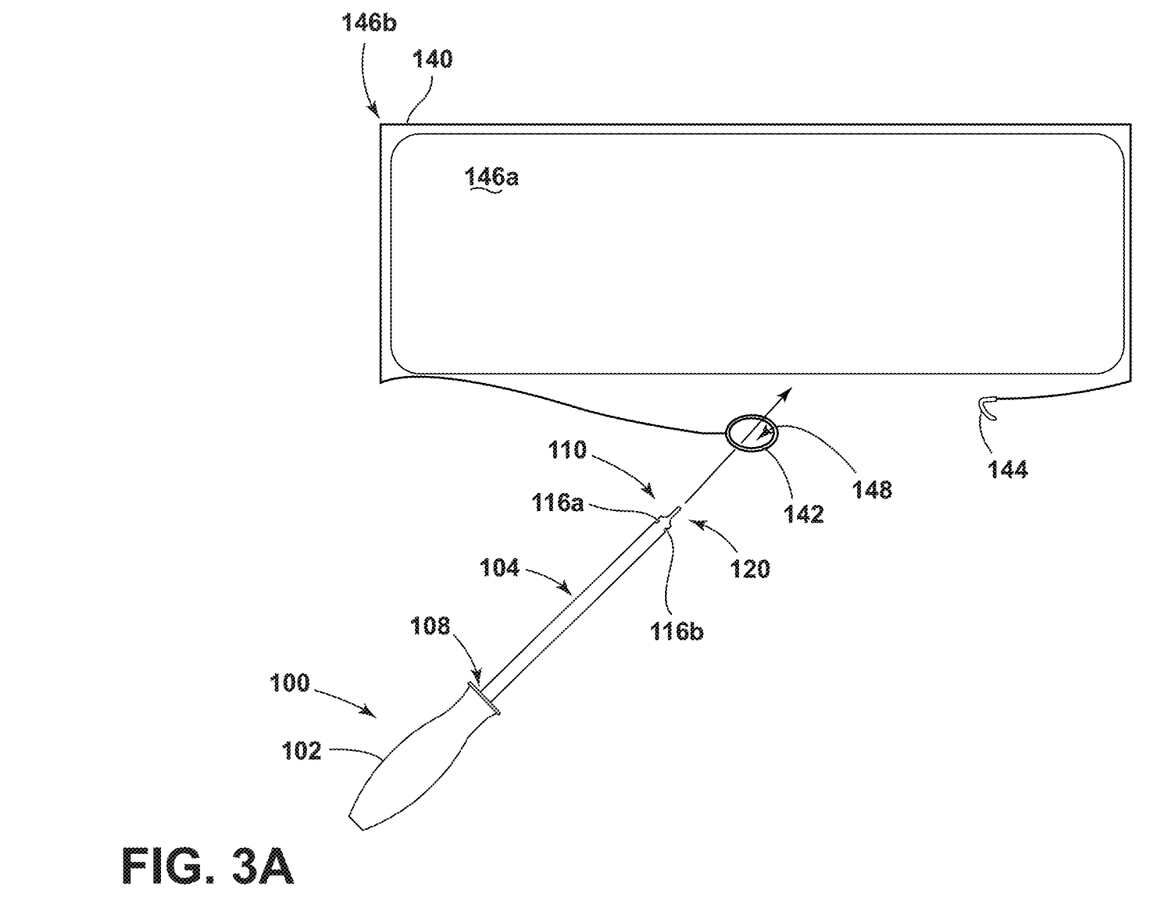
FIG. 3A-3F illustrate various steps of a method of operating a connecting tool according to an embodiment of the present disclosure.

An embodiment of a method of utilizing a connecting tool 100 is generally illustrated in FIGS. 3A-3F. The method may include engaging connecting portions 142, 144 of a connecting member 140 via the connecting tool 100, such as to connect a first component 146a with a second component 146b. Referring now to FIG. 3A, the connecting member 140 may be disposed on and/or partially surround a first component 146a and/or a second component 146b. A first connecting portion 142 (e.g., a loop) may be disposed at one end of the connecting member 140 and a second connecting portion 144 (e.g., a hook) may be disposed at the opposite end of the connecting member 140. During the operation and/or actuation, the first connecting portion 142 may be connected (e.g., slidably connected) to the shaft 104 of the connecting tool 100. In examples, slidably connecting the first connecting portion 142 to the shaft 104 may include inserting the operational end 110 of the connecting tool 100 through an opening 148 of the first connecting portion 142.

Figure 3B:
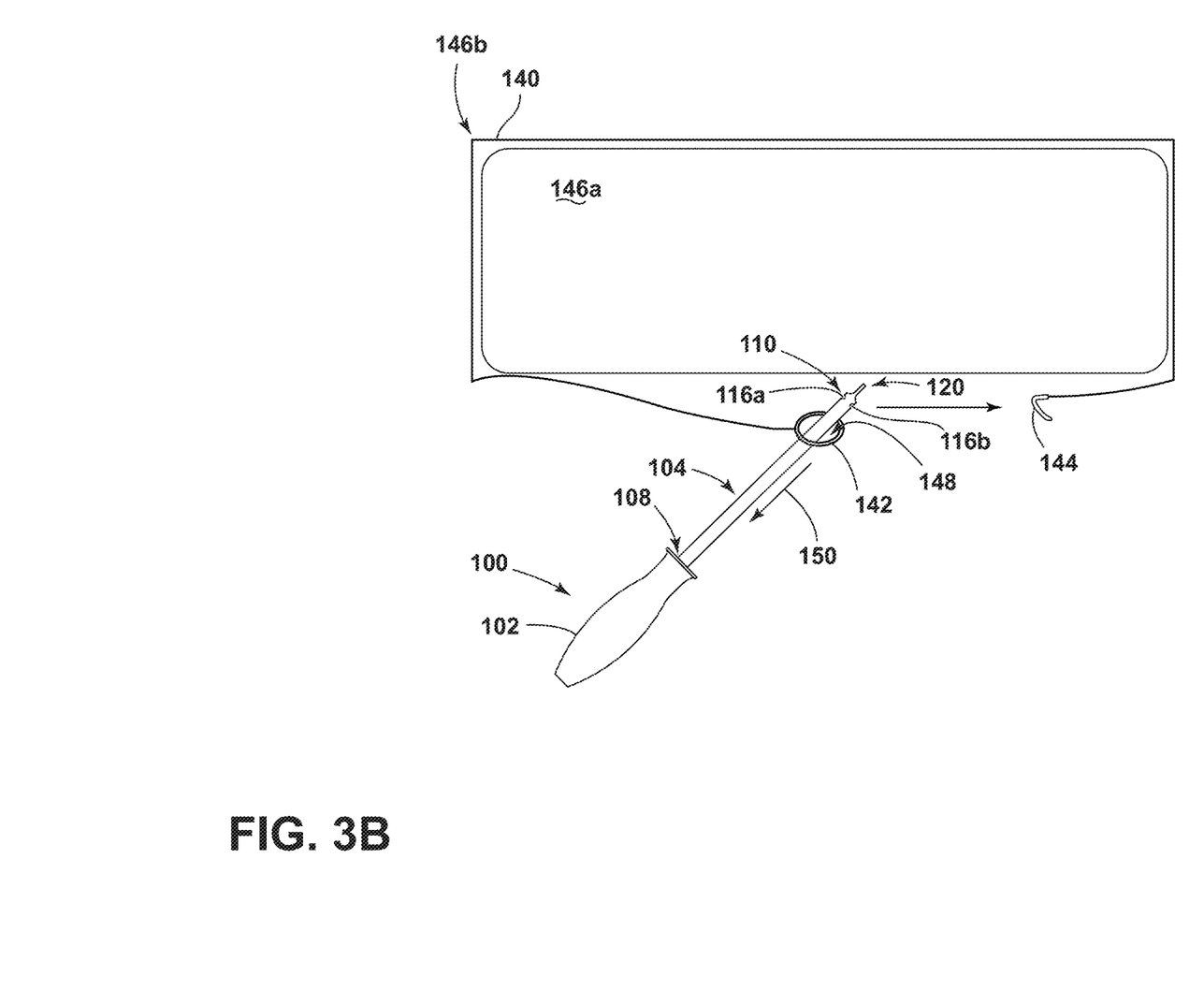

In embodiments, such as generally depicted in FIG. 3B, the second connecting portion 144 may be engaged with an aperture 130 of the connecting tool 100. This step may be performed after connecting the first connecting portion 142 to the shaft 104. Engaging the second connecting portion 144 with the aperture 130 may include inserting at least a portion of the second connecting portion 144 (e.g., the hook) into the aperture 130. The first connecting portion 142 may be adjusted, moved, and/or slid along the shaft 104 in a direction 150 toward the handle 102 to a region proximate the handle 102 and/or the base end 108 of the shaft 104, which may allow for engagement of the second connecting portion 144 and the connecting tool 100. The configuration of the connecting tool 100, which may include a shaft 104 (e.g., a relatively thin elongated shaft), may allow the user to reach and grab hold of the first and/or second connecting portions 142, 144 of the connecting member 140 more easily (e.g., with one hand on the connecting tool 100, instead of a hand on each of the connecting portions 142, 144).

Figure 3C:
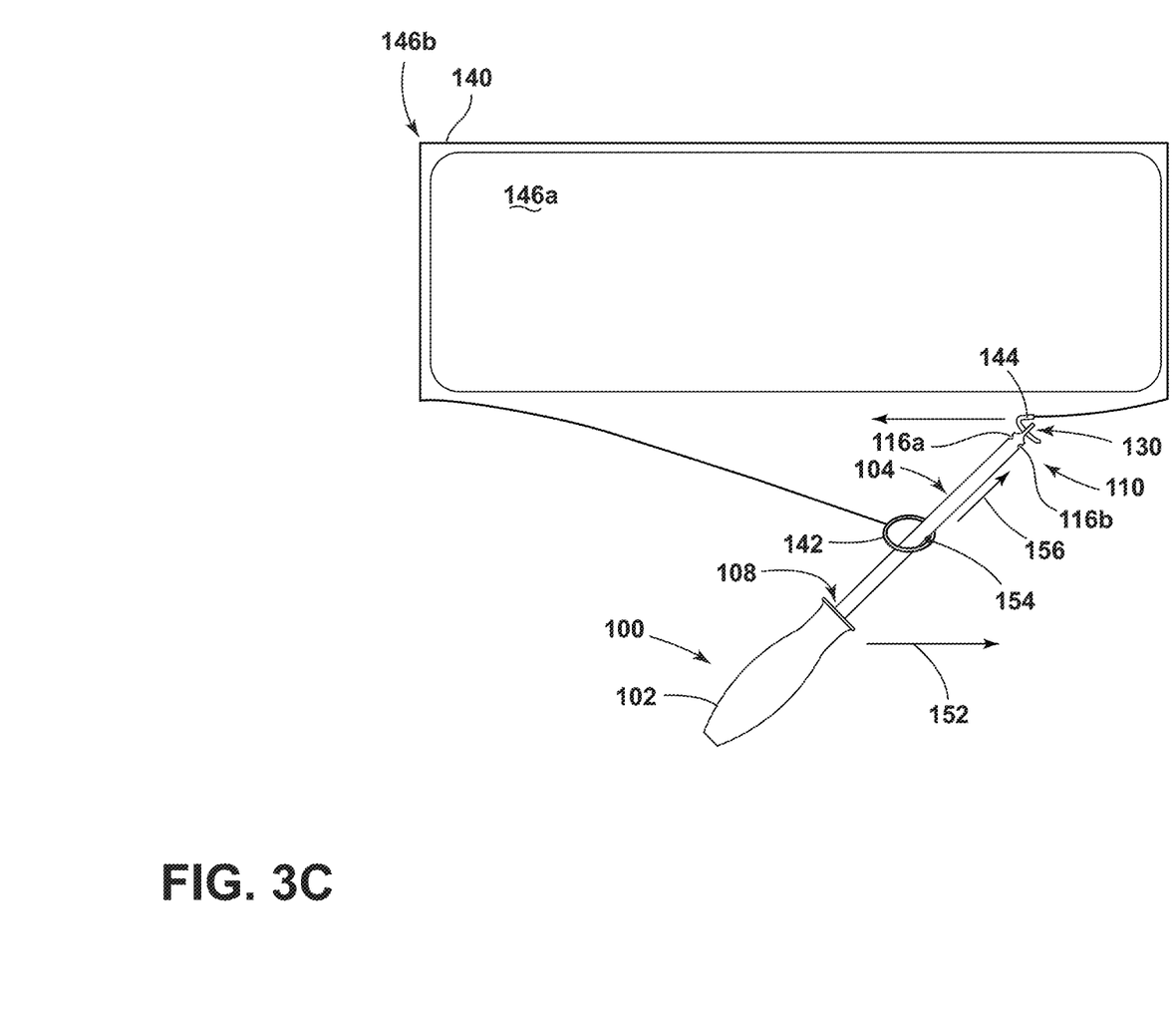

In embodiments, if the first and second connecting portions 142, 144 are engaged (e.g., positively engaged) with the connecting tool 100, the connecting tool 100 may be moved (e.g., rotated, pivoted, etc.) relative to the first component 146a, such as generally illustrated in FIG. 3C. Rotating the connecting tool 100 relative to the first component 146a may include at least one of adjusting, moving, pushing, and/or pulling a portion of the connecting tool 100, such as the base end 108 of the shaft 104 and/or the handle 102, in a direction 152 towards the second connecting portion 144. The connecting tool 100 may be rotated around a rotational axis 154, which may, for example, be defined by the first connecting portion 142, the second connecting portion 144, and/or between the first and second connecting portions 142, 144, among other locations. In some circumstances, the rotational axis 154 may be defined by the region of the first connecting portion 142 that is in contact and/or abutment with the shaft 104 of the connecting tool 100.

With embodiments, rotating the connecting tool 100 while the connecting tool 100 is engaged with the connecting portions 142, 144 may result in the first connecting portion 142 and/or the second connecting portion 144 being drawn and/or pulled closer together. Drawing the first connecting portion 142 and the second connecting portion 144 closer together may include elastically deforming and/or stretching at least a portion of the connecting member 140, the first component 146a, and/or the second component 146b. The connecting member 140, the first component 146a, and/or the second component 146b may be deformed such that the first and second connecting portions 142, 144 are drawn and/or adjusted to an overlapping configuration. If the connecting member 140 is elastic and/or configured to flex/stretch, the connecting member 140 may be elongated, at least temporarily, to a length that is larger than a length of the connecting member 140 when the first connecting portion 142 and the second connecting portion 144 are engaged. The connecting tool 100 may, for example and without limitation, function in a similar manner to a lever, such as with the first connecting portion 142 acting as a fulcrum and, thereby, reducing the amount of force for a user to actuate the connecting member 140 (e.g., engage the connecting portions 142, 144) and/or overcome any present resistance forces. Additionally or alternatively, engagement of the first and second connecting portions 142, 144 with the connecting tool 100 may facilitate the user maintaining hold of the first and second connecting portions 142, 144 while applying force to the connecting member 140.

In embodiments, rotating the connecting tool 100 may cause the first connecting portion 142 to slide along the shaft 104 in a direction 156 toward the operational end 110. As the first connecting portion 142 may define the rotational axis 154, sliding the first connecting portion 142 along the shaft 104 may also include shifting a position of the rotational axis 154 along the shaft 104 in the direction 156 toward the operational end 110 of the connecting tool 100.

Figure 3D:
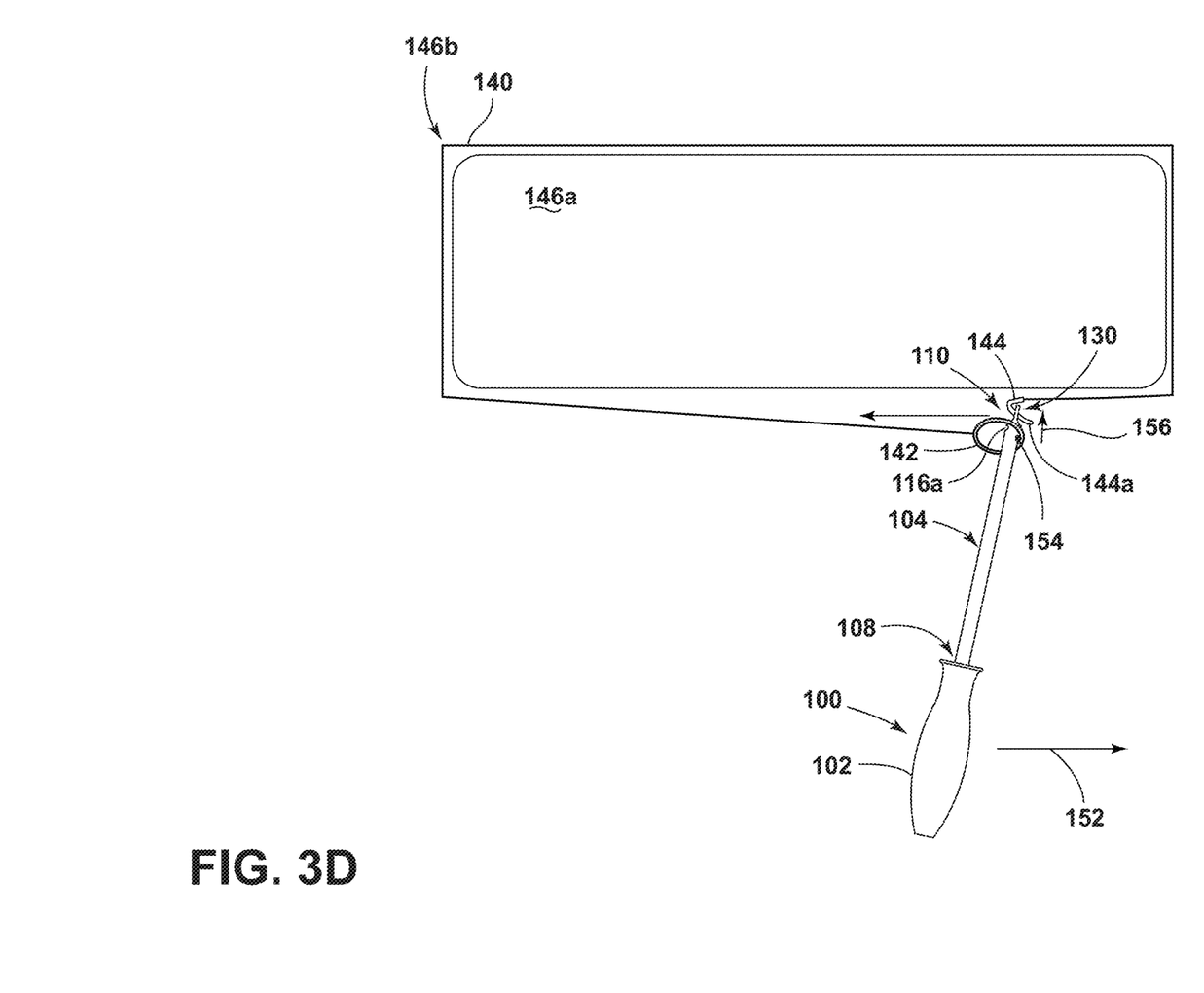
Figure 3E:
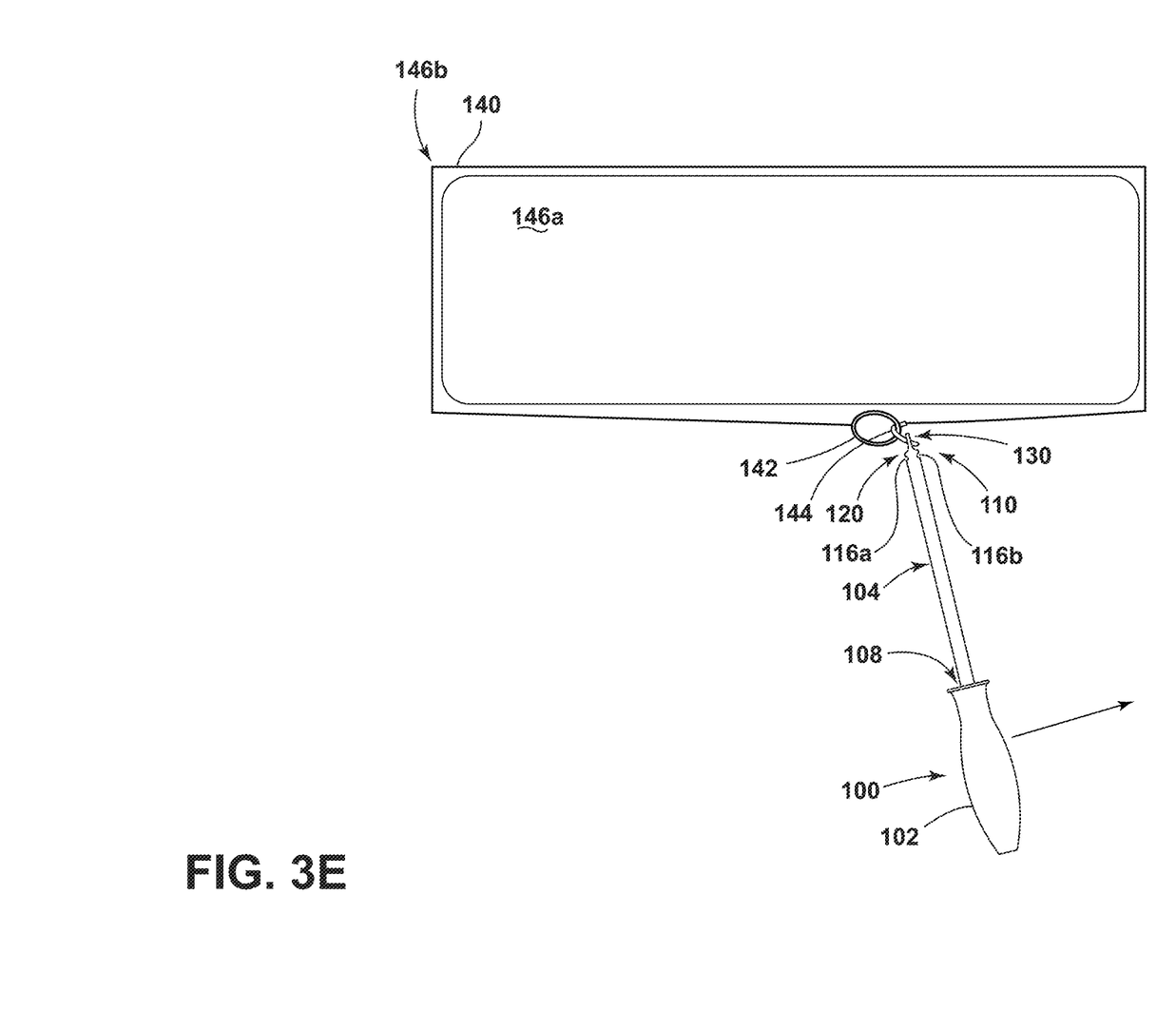

With embodiments, such as generally illustrated in FIG. 3D, the connecting tool 100 may be rotated such that the first connecting portion 142 slides along the shaft 104 and into at least temporary engagement with the recess 116a, 116b. Engaging the first connecting portion 142 with the recess 116a, 116b may include receiving at least a portion of the first connecting portion 142 in the recess 116a, 116b. Engaging the first connecting portion 142 in the recess 116a, 116b may halt the sliding motion of the first connecting portion 142 and hold the first connecting portion 142 and/or the rotational axis 154 in place while rotation of the connecting tool 100 continues. With continued rotation, the first connecting portion 142 may move (e.g., rotate) within the recess 116a, 116b, slide out of the recess 116, 116b, and/or slide off the operational end 110 of the connecting tool 100. As the first connecting portion 142 slides off of operational end 110, the first connecting portion 142 may engage the second connecting portion 144.

With embodiments, such as generally depicted in FIGS. 3A through 3F, the recesses 116a, 116b may be configured to retain the first connecting portion 142 such that the first and second connecting portions 142, 144 may be moved, adjusted, drawn, and/or displaced a sufficient distance by the connecting tool 100 such that the first connecting portion 142 properly engages the second connecting portion 144 when sliding off the operational end 110. The first connecting portion 142 may move out of the recess 116a, 116b and slide off of the operational end 110 to disengage the connecting tool 100 when the connecting tool 100 is rotated past a generally perpendicular position (see, e.g., FIG. 3D), such as 30, 45, or 60 degrees past perpendicular, for example (see, e.g., FIG. 3E). For example and without limitation, a recess 116a, 116b may be configured to retain the first connecting portion 142 such that the connecting tool 100 may move the first connecting portion 142 at least partially beyond an end 144a of the second connecting portion 144 before the first connecting portion 142 slides further along the shaft 104. With some other tool configurations, such as configurations that do not include a recess 116a, 116b, the first connecting portion 142 may slide off of and disengage the tool in a vertical position, which may not move the first connecting portion 142 at least partially beyond the end 144a of the second connecting portion 144, which may result in the first connecting portion 142 not engaging the second connecting portion 144.

In embodiments, a position (e.g., an axial position) of a recess 116a, 116b along the shaft 104 and/or a depth of the recess 116a, 116b may, for example, correspond to a size/length of the end 144a. For example and without limitation, with larger ends 144a, the recess 116a, 116b may be farther from the axial surface 126 and/or may be deeper than with smaller ends 144a.

Figure 3F:
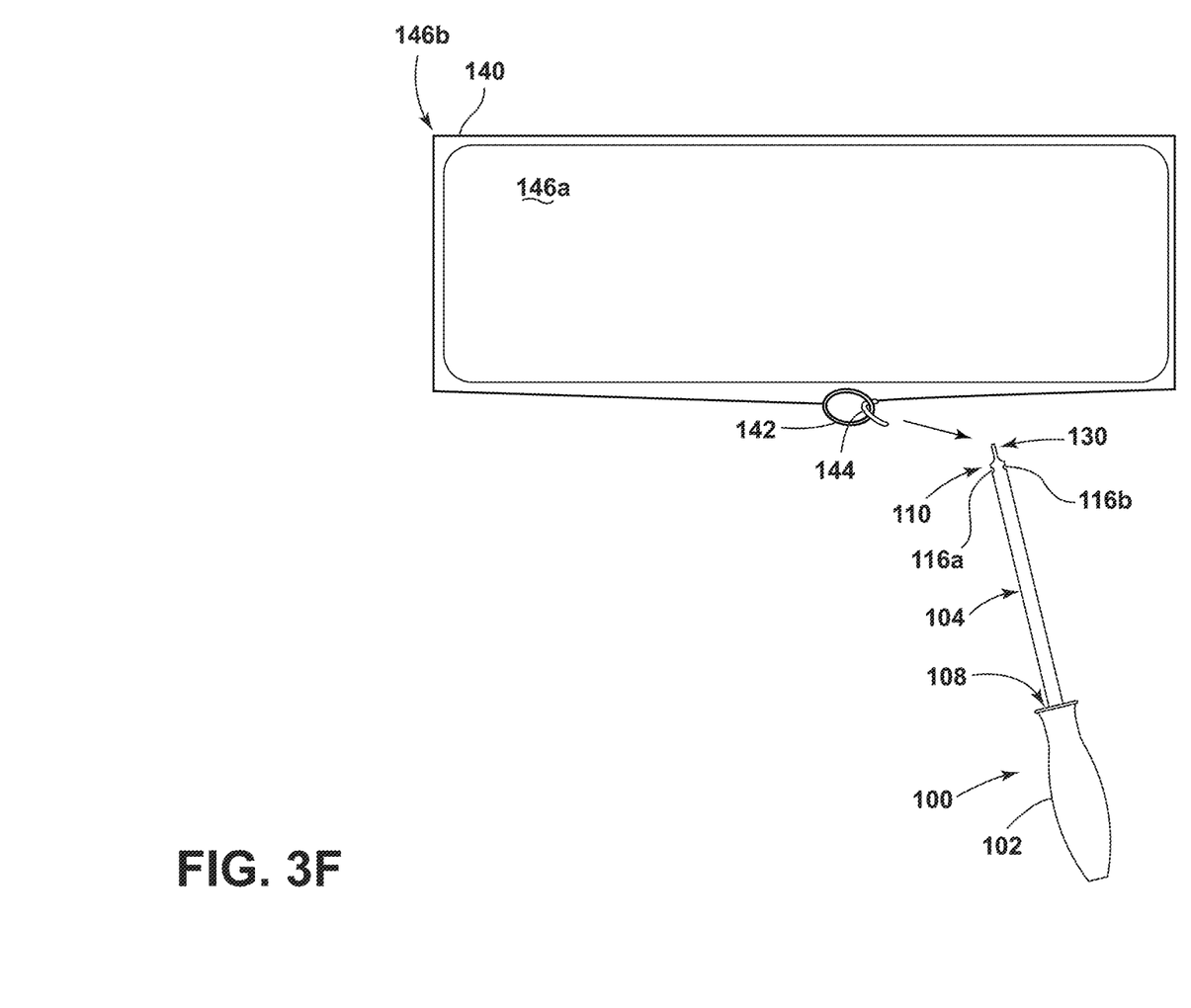

In embodiments, such as generally illustrated in in FIG. 3F, once the first connecting portion 142 and the second connecting portion 144 are engaged, the second connecting portion 144 may be disengaged from the connecting tool 100, which may include removing the second connecting portion 144 from the aperture 130. In some examples, the first connecting portion 142 may slide off the operational end 110 of the connecting tool 100 with enough force to push out and/or remove the second connecting portion 144 from the aperture 130 thereby disengaging the second connecting portion 144 from the connecting tool 100. After the first and second connecting portions 142, 144 are engaged with each other, the first and second connecting portions 142, 144 may restrict relative movement of the first component 146a and the second component 146b.

With embodiments, forces applied by a connected connecting member 140 to the second component 146b (and/or the first component 146a) may, for example, pull the second component 146b into substantially contact with the first component 146a. For example and without limitation, with a seating application (see, e.g., FIG. 4), connecting the connecting portions 142, 144 of the connecting member 140 may pull and/or hold the second component 146b taut around the first component 146a and/or remove wrinkles in the second component 146b.

In embodiments, forces involved with connecting the connecting portions 142, 144 may be near, at, or above an amount of force that a user may be expected to provide without the use of a connecting tool 100. The connecting tool 100 may, effectively, multiply the force provided by a user while also facilitating alignment and engagement of the connecting portions 142, 144.

With some embodiments, an outer dimension of the shaft 104 may be sufficiently large (e.g., relative to the size of the end 144a of the second connecting portion 144) and/or the aperture 130 may be sufficiently offset from the shaft axis 106 such that movement/rotation of the connecting tool 100 may result in engagement of the connecting portions 142, 144 without the first connecting portion engaging a recess 116a, 116b, which the shaft 104 may or may not include.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or nonfunctional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

What is claimed is:

1. A connecting tool for connecting a first connecting portion and a second connecting portion of a connecting member, comprising:
   a shaft, including:
   a shaft axis;
   an operational end; and
   a body connected to the operational end;
   wherein the shaft includes a recess configured to engage said first connecting portion;
   wherein the operational end includes an aperture configured to engage said second connecting portion;
   the operational end includes a tip portion having a curved surface and a planar surface;
   the aperture is disposed in the planar surface; and
   a notch is disposed in the curved surface adjacent to the aperture.

2. The connecting tool according to claim 1, wherein:
   the curved surface is disposed axially between the recess and the planar surface.

3. The connecting tool according to claim 2, wherein:
   the planar surface extends substantially parallel to the shaft axis;
   the curved surface extends from an axial end of the planar surface to an external surface of the shaft; and
   the curved surface is concave.

4. The connecting tool according to claim 3, wherein:
the notch is at least partially defined by (i) a first surface that is substantially parallel to the planar surface, and (ii) a second surface that is disposed obliquely or perpendicularly to the first surface.

5. The connecting tool according to claim 1, wherein:
the aperture comprises a through-hole extending through the operational end perpendicular to the shaft axis; and
the aperture has a substantially trapezoidal cross-section.

6. The connecting tool according to claim 1, wherein the shaft includes a second recess disposed opposite the recess.

7. The connecting tool according to claim 1, wherein:
the recess includes a semicylindrical configuration; and
the recess has a recess axis that extends substantially perpendicular to the shaft axis and an aperture axis of the aperture.

8. A connecting tool for connecting a first connecting portion and a second connecting portion of a connecting member, comprising:
a shaft, including:
a shaft axis;
an operational end; and
a body connected to the operational end;
wherein the shaft includes a recess configured to engage said first connecting portion;
wherein the operational end includes an aperture configured to engage said second connecting portion;
the operational end includes a tip portion having a first curved surface, a second curved surface, a first planar surface, and a second planar surface;
the first curved surface and the second curved surface are disposed opposite one another relative to the shaft axis and are concave relative to the shaft axis;
the first planar surface and the second planar surface extend substantially parallel to one another and to the shaft axis;
the first curved surface extends from an axial end of the first planar surface to an external surface of the shaft; and
the second curved surface extends from an axial end of the second planar surface to the external surface of the shaft.

9. The connecting tool according to claim 8, wherein:
the aperture comprises a through-hole extending through the tip portion from the first planar surface to the second planar surface;
the aperture extends at least to the axial end of the first planar surface and to the axial end of the second planar surface such that the aperture is disposed substantially adjacent to the first curved surface and the second curved surface;
a first notch is disposed in the first curved surface;
a second notch is disposed in the second curved surface;
the first notch is at least partially defined by (i) a first surface that is substantially coplanar with the first planar surface and that extends to a first axial end of the aperture, and (ii) a first arc-shaped surface that is disposed obliquely or perpendicularly to the first surface; and
the second notch is at least partially defined by (i) a second surface that is substantially coplanar with the second planar surface and that extends to a second axial end of the aperture, and (ii) a second arc-shaped surface that is disposed obliquely or perpendicular to the second surface.

10. A connecting tool for connecting a first connecting portion and a second connecting portion of a connecting member, comprising:
a shaft, including:
a shaft axis;
an operational end; and
a body connected to the operational end;
wherein the shaft includes a recess configured to engage said first connecting portion;
wherein the operational end includes an aperture configured to engage said second connecting portion;
the aperture comprises a through-hole extending through the operational end and has an aperture axis;
the recess includes a semicylindrical configuration and has a recess axis; and
the shaft axis, the aperture axis, and the recess axis are each perpendicular to one another.

11. A method of operating the connecting tool of claim 1 to connect the first connecting portion and the second connecting portion of the connecting member, the method comprising:
slidably connecting the first connecting portion to the shaft of the connecting tool;
engaging the second connecting portion with the operational end of the connecting tool;
rotating the connecting tool relative to the first connecting portion;
sliding the first connecting portion along the shaft; and
moving the first connecting portion off the operational end of the connecting tool and into engagement with the second connecting portion.

12. The method according to claim 11, wherein rotating the connecting tool relative to the first connecting portion includes drawing the first connecting portion and the second connecting portion closer together.

13. The method according to claim 12, wherein drawing the first connecting portion and the second connecting portion closer together includes elastically deforming at least a portion of the at least one connecting member.

14. The method according to claim 11, wherein slidably connecting the first connecting portion to the shaft of the connecting tool includes inserting the operational end of the connecting tool through an opening of the first connecting portion.

15. The method according to claim 11, wherein:
the operational end includes a through-hole extending through the operational end; and
engaging the second connecting portion with the operational end includes inserting a portion of the second connecting portion into the through-hole.

16. The method according to claim 15, wherein slidably connecting the first connecting portion to the shaft of the connecting tool includes inserting the operational end of the connecting tool through an opening of the first connecting portion prior to inserting the portion of the second connecting portion into the through-hole of the connecting tool.

17. The method according to claim 11, wherein rotating the connecting tool relative to the first connecting portion includes at least one of pushing and pulling a portion of the connecting tool towards the second connecting portion;
moving the first connecting portion off the operational end of the connecting tool and into engagement with the second connecting portion includes connecting a first component with a second component;

the connecting member is disposed at least partially in the second component;
the first component includes a seat; and
the second component includes a trim piece for the seat.

18. The method according to claim 11, wherein sliding the first connecting portion along the shaft includes temporarily engaging the first connecting portion with the recess.

19. The method according to claim 18, wherein:
rotating the connecting tool relative to the first connecting portion includes rotating the connecting tool around a rotational axis;
sliding the first connecting portion along the shaft includes shifting a position of the rotational axis along the shaft toward the operational end; and
temporarily engaging the first connecting portion with the recess includes temporarily maintaining the position of the first connecting portion while rotating the connecting tool about the rotational axis.

20. A connecting tool for connecting a first connecting portion and a second connecting portion of a connecting member, comprising:
a shaft, including:
a shaft axis;
an operational end; and
a body connected to the operational end;
wherein the shaft includes a recess that protrudes into the shaft towards the shaft axis and is configured to engage said first connecting portion; and
wherein the operational end includes an aperture configured to engage said second connecting portion.

* * * * *